United States Patent
Shin

(10) Patent No.: US 12,466,380 B2
(45) Date of Patent: Nov. 11, 2025

(54) ELECTRONIC PARKING BRAKE SYSTEM AND CONTROL METHOD THEREOF

(71) Applicant: HL MANDO CORPORATION

(72) Inventor: Jinseop Shin, Seoul (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 243 days.

(21) Appl. No.: 17/898,964

(22) Filed: Aug. 30, 2022

(65) Prior Publication Data

US 2023/0066292 A1 Mar. 2, 2023

(30) Foreign Application Priority Data

Aug. 31, 2021 (KR) .................. 10-2021-0115652

(51) Int. Cl.
| | |
|---|---|
| *B60T 13/74* | (2006.01) |
| *B60T 8/171* | (2006.01) |
| *B60T 8/172* | (2006.01) |
| *B60T 17/22* | (2006.01) |
| *F16D 65/18* | (2006.01) |

(Continued)

(52) U.S. Cl.
CPC ............ *B60T 13/746* (2013.01); *B60T 8/171* (2013.01); *B60T 8/172* (2013.01); *B60T 17/22* (2013.01); *F16D 65/18* (2013.01); *H02P 29/60* (2016.02); *B60T 1/065* (2013.01); *F16D 2066/001* (2013.01); *F16D 2066/006* (2013.01); *F16D 2121/24* (2013.01); *F16D 2125/40* (2013.01)

(58) Field of Classification Search
CPC ........ B60T 13/746; B60T 8/171; B60T 8/172; B60T 17/22; B60T 1/065; B60T 2201/10; F16D 65/18; F16D 2066/001; F16D 2066/006; F16D 2121/24; F16D 2125/40; H02P 29/60

See application file for complete search history.

(56) References Cited

U.S. PATENT DOCUMENTS

| | | | |
|---|---|---|---|
| 10,569,657 B2 * | 2/2020 | Yamamoto | ............. B60T 13/142 |
| 2005/0077783 A1 * | 4/2005 | Suzuki | ................... B60T 13/746 |
| | | | 303/89 |

(Continued)

FOREIGN PATENT DOCUMENTS

| | | |
|---|---|---|
| JP | 4998344 B2 | 8/2012 |
| JP | 6562811 B2 | 8/2019 |

*Primary Examiner* — Abdalla A Khaled
(74) *Attorney, Agent, or Firm* — LEE, HONG, DEGERMAN, KANG & WAIMEY

(57) ABSTRACT

An electronic parking brake system including: an electronic parking brake (EPB) including a piston provided to press a pair of brake pads disposed on opposite sides of a brake disk rotating together with a wheel of a vehicle, a nut member provided to press the piston, a spindle member provided to move the nut member, and an electric motor provided to rotate the spindle member, and a controller electrically connected to the electric motor, wherein the controller identifies whether a requested parking operation is an initial parking operation, estimates a motor temperature depending on a voltage drop amount of the electric motor in the case of not being the initial parking operation, estimates a clamping force required for parking depending on the motor temperature, and ends the parking operation when the clamping force reaches a target clamping force.

10 Claims, 6 Drawing Sheets

(51) Int. Cl.
*H02P 29/60* (2016.01)
*B60T 1/06* (2006.01)
*F16D 66/00* (2006.01)
*F16D 121/24* (2012.01)
*F16D 125/40* (2012.01)

(56) References Cited

U.S. PATENT DOCUMENTS

| | | | | |
|---|---|---|---|---|
| 2006/0163939 | A1* | 7/2006 | Kuramochi | B60T 8/885 303/122.04 |
| 2011/0073423 | A1* | 3/2011 | Moon | B60T 8/885 188/158 |
| 2014/0149012 | A1* | 5/2014 | Shiraki | B60T 13/741 701/70 |
| 2015/0027823 | A1* | 1/2015 | Murata | B60T 7/12 188/162 |
| 2015/0120163 | A1* | 4/2015 | Ohara | B60T 7/108 701/70 |
| 2015/0217743 | A1* | 8/2015 | Blattert | B60T 7/122 701/70 |
| 2017/0361837 | A1* | 12/2017 | Morisaki | B60W 20/13 |
| 2018/0126973 | A1* | 5/2018 | Choe | F16D 55/226 |
| 2019/0190411 | A1* | 6/2019 | Kamio | H02P 6/153 |
| 2019/0257378 | A1* | 8/2019 | Masuda | F16D 65/183 |
| 2020/0232531 | A1* | 7/2020 | Robere | F16D 66/00 |
| 2020/0247382 | A1* | 8/2020 | Chang | B60Q 9/002 |
| 2021/0122349 | A1* | 4/2021 | Leiber | B60T 13/662 |
| 2022/0046140 | A1* | 2/2022 | Ji-Young | H02P 7/06 |
| 2022/0052633 | A1* | 2/2022 | Reddy | H02P 23/0022 |
| 2022/0153243 | A1* | 5/2022 | Witte | F16D 55/226 |
| 2022/0158582 | A1* | 5/2022 | Fujikura | G01K 13/00 |
| 2022/0399849 | A1* | 12/2022 | Kim | H02P 29/60 |
| 2024/0294159 | A1* | 9/2024 | Ramirez Hernandez | H02P 23/14 |
| 2024/0313673 | A1* | 9/2024 | Ono | F16D 48/06 |

* cited by examiner

[FIG. 1]
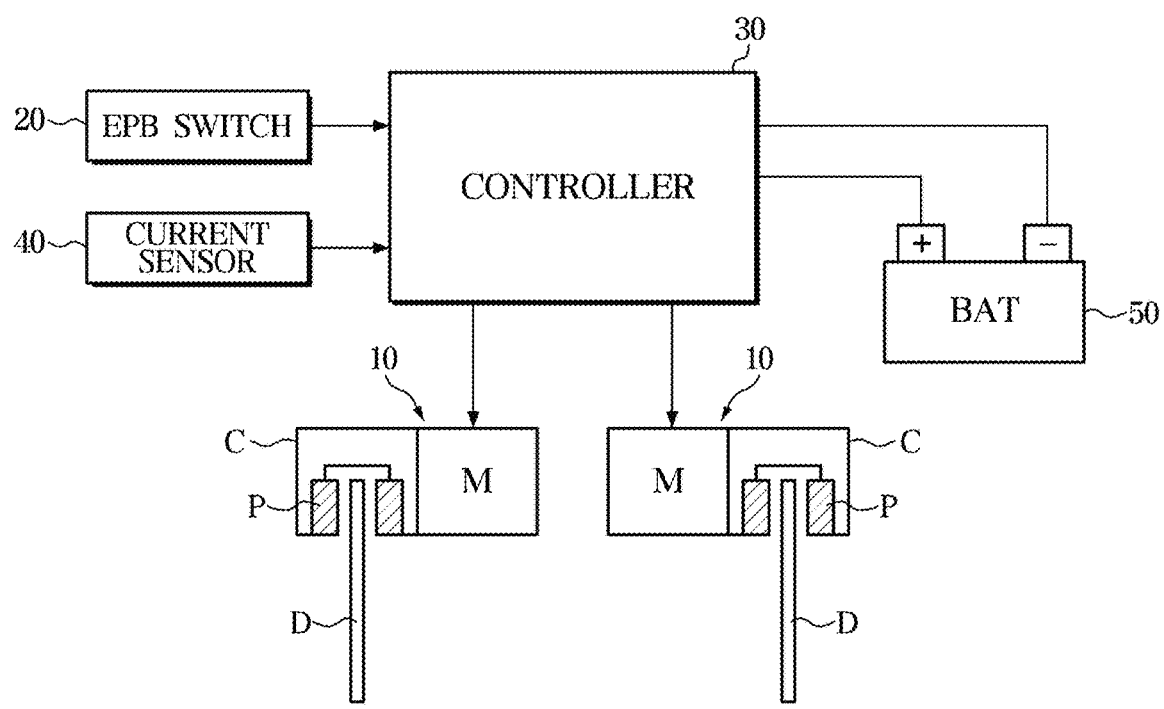

[FIG. 2]
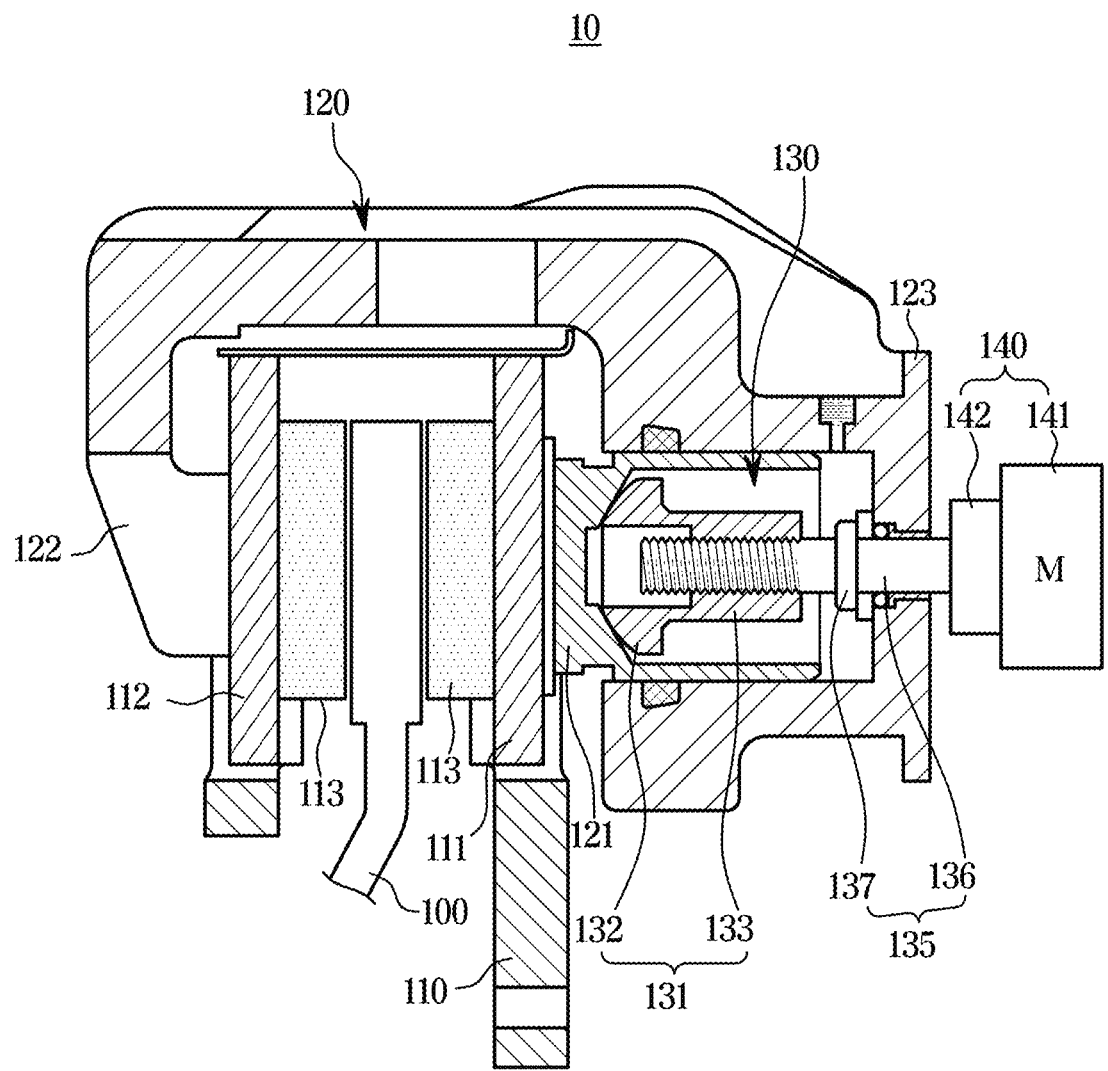

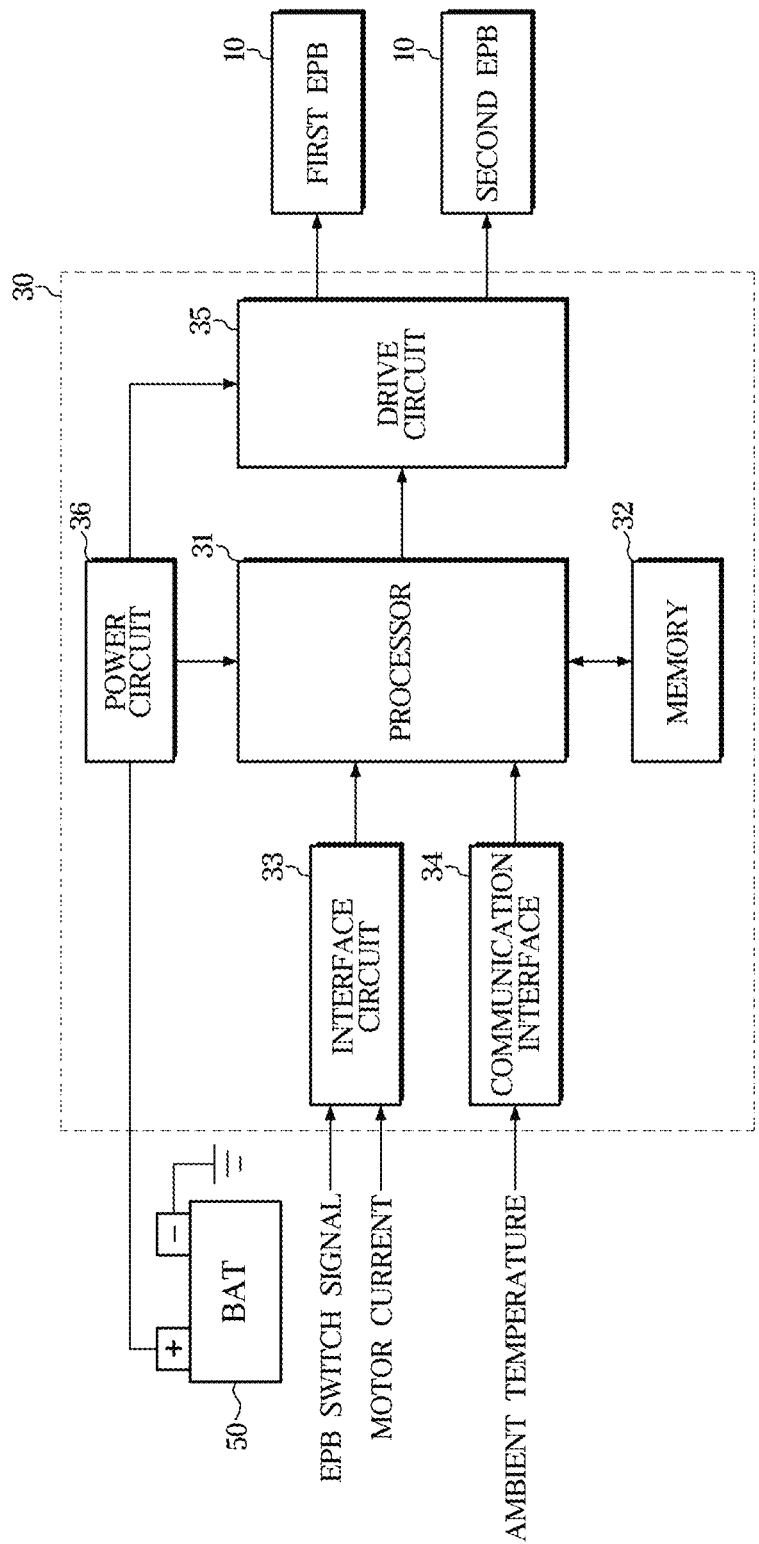

[FIG. 4]
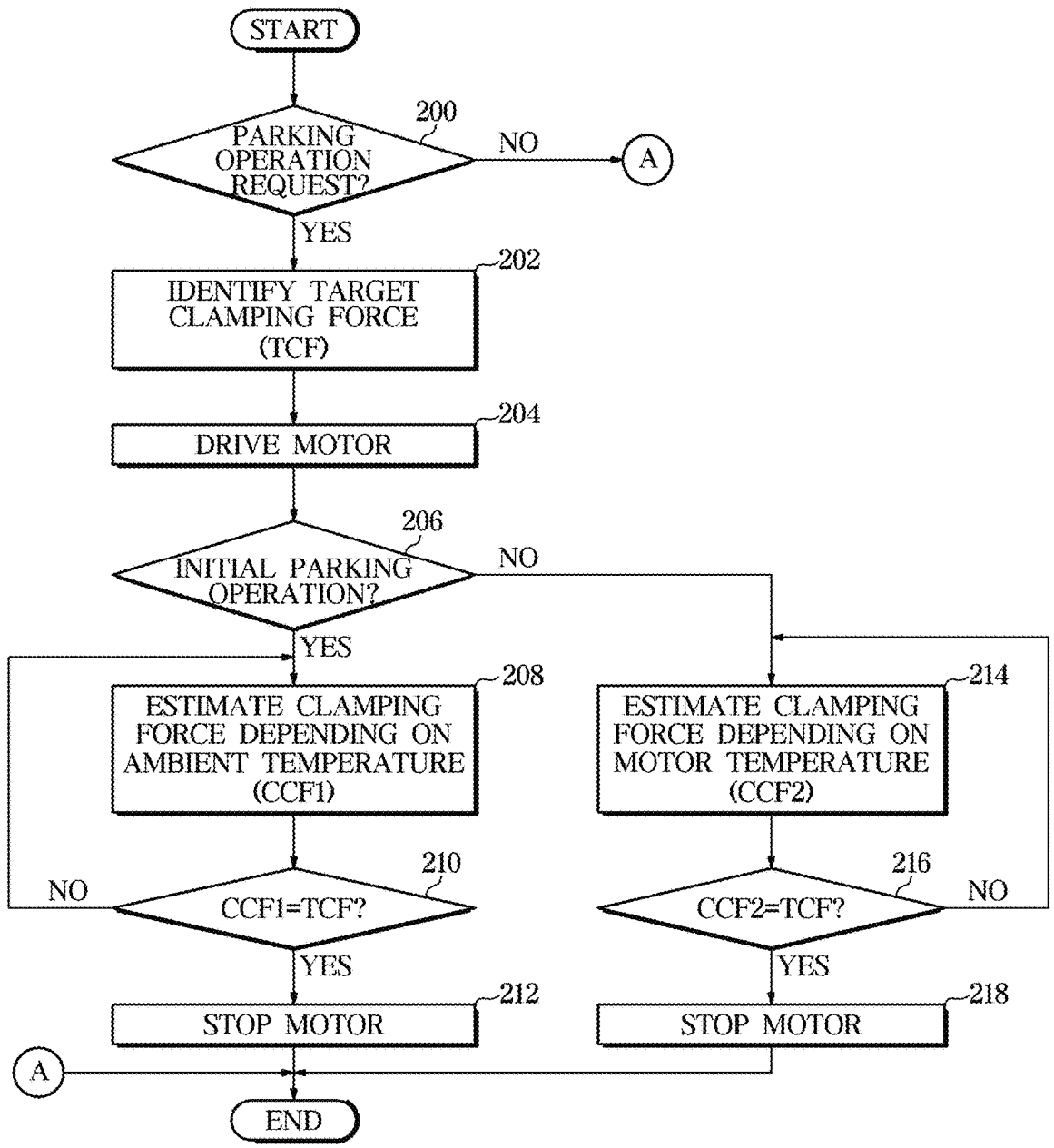

[FIG. 5]
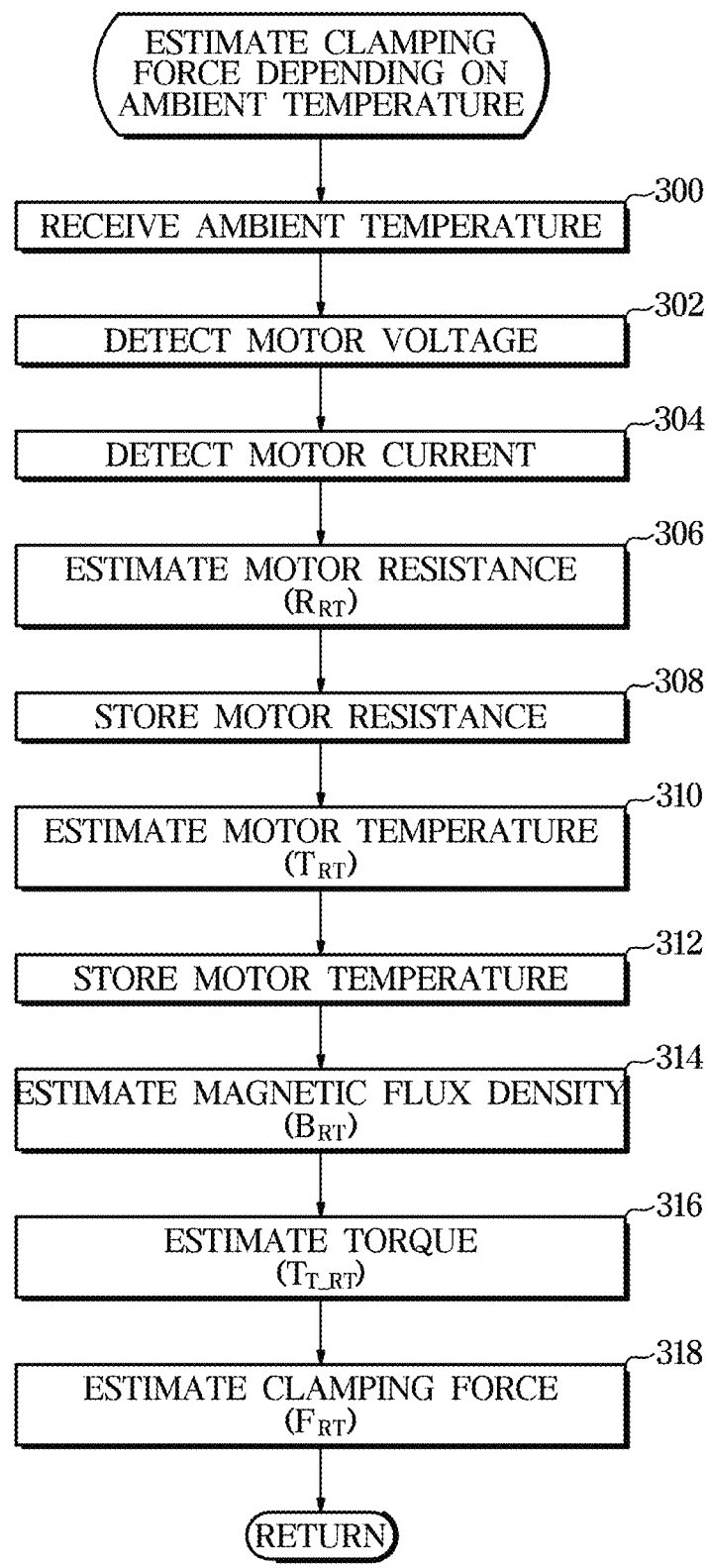

[FIG. 6]
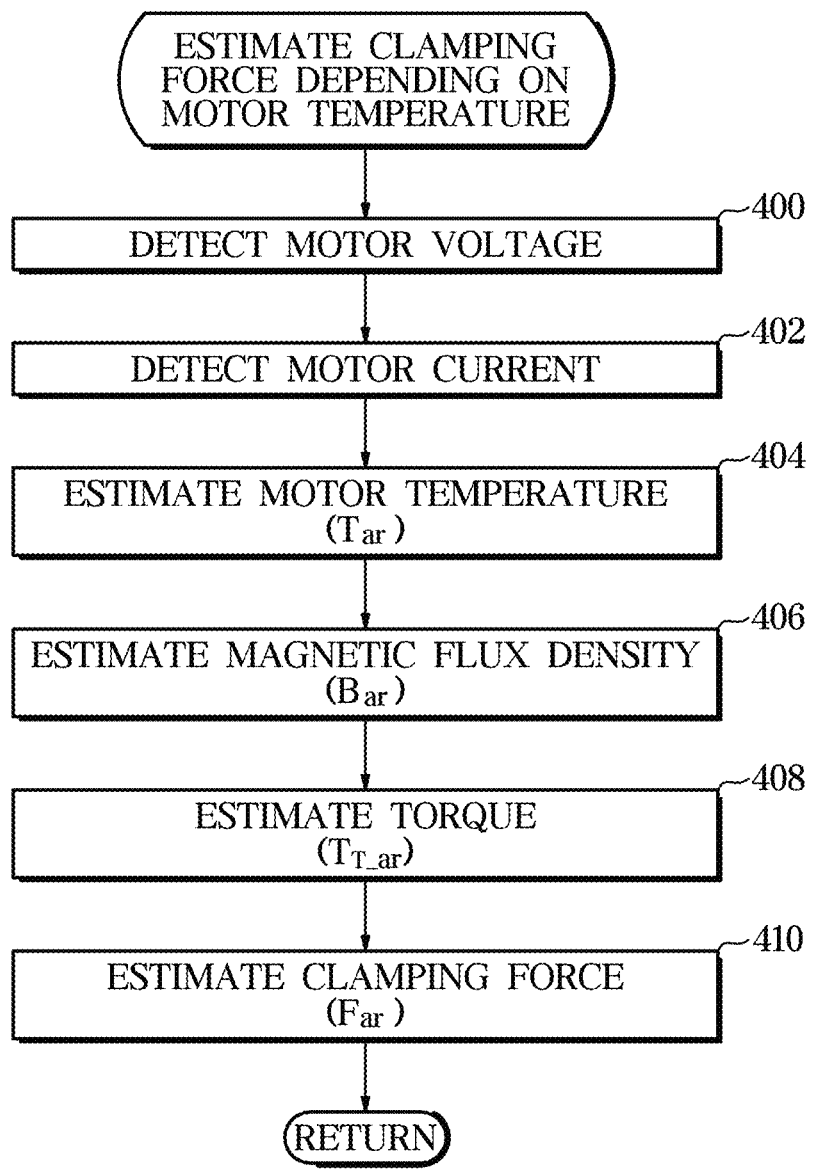

ELECTRONIC PARKING BRAKE SYSTEM AND CONTROL METHOD THEREOF

CROSS-REFERENCE TO RELATED APPLICATION(S)

This application is based on and claims priority under 35 U.S.C. § 119 to Korean Patent Application No. 10-2021-0115652, filed on Aug. 31, 2021, in the Korean Intellectual Property Office, the disclosure of which is incorporated by reference herein in its entirety.

BACKGROUND

1. Field

The disclosure relates to an electronic parking brake system for controlling operation or release of an electronic parking brake, and a control method thereof.

2. Description of the Related Art

A motor-on-caliper type electronic parking brake system increases a torque generated from a motor through a reducer to generate a clamping force required for parking by a mechanical structure device inside a caliper. Such an electronic parking brake system generates the clamping force by pressing a brake pad to a brake disk rotating together with a wheel by moving a piston forward by the motor in a parking operation.

Conventionally, in controlling the clamping force, an only control factor provided is a current signal. This ends control by identifying that the required clamping force is satisfied when a current of the motor reaches a certain value using the principle that the output torque is proportional to the current.

After a vehicle is driven, a motor temperature may be different from an ambient temperature due to the influence of the brake disk of a high temperature. That is, due to an increase in temperature of the brake disk due to repeated braking during vehicle driving and the characteristics of the electronic parking brake located close to the brake disk, the motor temperature also rises.

The performance of the motor may vary depending on the temperature. In particular, the performance of the motor tends to deteriorate rapidly at a high temperature compared to room temperature.

Due to a change in motor temperature, the control may end in a state where the clamping force is not constant and the clamping force is insufficiently formed.

Conventionally, because a temperature sensor for detecting a motor temperature is not installed, the motor temperature may not be known, and thus a margin for the clamping force is set to be large so that it may be applied to all required environments, which may directly lead to a loss of competitiveness in durability, cost, size, weight, etc. of the product.

SUMMARY

It is an aspect of the disclosure to provide an electronic parking brake system capable of estimating a temperature of a motor without a temperature sensor and preventing a change in the clamping force depending on a change in temperature and voltage of the motor, and a control method thereof.

Additional aspects of the disclosure will be set forth in part in the description which follows and, in part, will be obvious from the description, or may be learned by practice of the disclosure.

In accordance with an aspect of the disclosure, an electronic parking brake system includes an electronic parking brake (EPB) comprising a piston provided to press a pair of brake pads disposed on opposite sides of a brake disk rotating together with a wheel of a vehicle, a nut member provided to press the piston, a spindle member provided to move the nut member, and an electric motor provided to rotate the spindle member, and a controller electrically connected to the electric motor, wherein the controller identifies whether a requested parking operation is an initial parking operation, estimates a motor temperature depending on a voltage drop amount of the electric motor in the case of not being the initial parking operation, estimates a clamping force required for parking depending on the motor temperature, and ends the parking operation when the clamping force reaches a target clamping force.

The controller may estimate a first motor temperature depending on an ambient temperature in the case of being the initial parking operation, estimate a first clamping force depending on the first motor temperature, and end the parking operation when the first clamping force reaches the target clamping force.

The controller may estimate a motor resistance of the electric motor and stores the motor resistance and the first motor temperature in a memory, and the motor resistance may be a resistance value obtained by dividing a voltage obtained by subtracting a voltage drop of a wire harness from a voltage of the electric motor by a no-load current.

The controller may estimate a first magnetic flux density based on the first motor temperature, estimate a first torque of the electric motor based on the first magnetic flux density, a motor current, and a torque constant, and estimate the first clamping force based on the first torque.

The controller may, in the case of not being the initial parking operation, estimate a second motor temperature based on the voltage drop amount of the electric motor and a first motor temperature in the initial parking operation.

The controller may estimate a second magnetic flux density based on a temperature difference between the first motor temperature and the second motor temperature and a first magnetic flux density in the initial parking operation.

The controller may estimate a second torque of the electric motor based on the second magnetic flux density, a motor current, and a torque constant.

The controller may estimate the clamping force based on the second torque.

The electronic parking brake may be a motor-on-caliper type electronic parking brake or an electric drum brake.

In accordance with another aspect of the disclosure, a control method of an electronic parking brake system for controlling an electronic parking brake providing a clamping force required for parking to a vehicle by an electric motor is provided, the control method including identifying whether a requested parking operation is an initial parking operation, estimating a motor temperature depending on a voltage drop amount of the electric motor in the case of not being the initial parking operation, estimating the clamping force depending on the motor temperature, and ending the parking operation when the clamping force reaches a target clamping force.

The control method may further include estimating a first motor temperature depending on an ambient temperature in the case of being the initial parking operation, estimating a first clamping force depending on the first motor temperature, and ending the parking operation when the first clamping force reaches the target clamping force.

The estimating of the first clamping force depending on the first motor temperature may include estimating a first magnetic flux density based on the first motor temperature, estimating a first torque of the electric motor based on the first magnetic flux density, a motor current, and a torque constant, and estimating the first clamping force based on the first torque.

The estimating of the motor temperature depending on the voltage drop amount of the electric motor may include estimating a second motor temperature based on the voltage drop amount of the electric motor and a first motor temperature in the initial parking operation.

The estimating of the clamping force depending on the motor temperature may include estimating a second magnetic flux density based on a temperature difference between the first motor temperature and the second motor temperature and a first magnetic flux density in the initial parking operation, estimating a second torque of the electric motor based on the second magnetic flux density, a motor current, and a torque constant, and estimating the clamping force based on the second torque.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a configuration diagram of an electronic parking brake system according to an embodiment;

FIG. 2 is a configuration view of an electronic parking brake applied to the electronic parking brake system according to an embodiment;

FIG. 3 is a control block diagram of the electronic parking brake system according to an embodiment;

FIG. 4 is a flowchart of a control method of the electronic parking brake system according to an embodiment;

FIG. 5 is a flowchart illustrating a process of estimating a clamping force depending on an ambient temperature in the flowchart of FIG. 4; and FIG. 6 is a flowchart illustrating a process of estimating the clamping force depending on a motor temperature in the flowchart of FIG. 4.

DETAILED DESCRIPTION

Like reference numerals refer to like elements throughout the specification. This specification does not describe all the elements of the embodiments, and duplicative contents between general contents or embodiments in the technical field of the present disclosure will be omitted. The terms 'part,' 'module,' 'member,' and 'block' used in this specification may be embodied as software or hardware, and it is also possible for a plurality of 'parts,' 'modules,' 'members,' and 'blocks' to be embodied as one component, or one 'part,' 'module,' 'member,' and 'block' to include a plurality of components according to embodiments.

Throughout the specification, when a part is referred to as being "connected" to another part, it includes not only a direct connection but also an indirect connection, and the indirect connection includes connecting through a wireless network.

Also, when it is described that a part "includes" an element, it means that the element may further include other elements, not excluding the other elements unless specifically stated otherwise.

Throughout the specification, when a member is described as being "on" another member, this includes not only a case in which a member is in contact with another member but also a case in which another member is present between the two members.

The terms 'first,' 'second,' etc. are used to distinguish one element from another element, and the elements are not limited by the above-mentioned terms. The singular forms "a," "an," and "the" include plural referents unless the context clearly dictates otherwise.

In each step, an identification numeral is used for convenience of explanation, the identification numeral does not describe the order of the steps, and each step may be performed differently from the order specified unless the context clearly states a particular order.

FIG. 1 is a configuration diagram of an electronic parking brake system according to an embodiment.

Referring to FIG. 1, an electronic parking brake system may include an electronic parking brake (EPB) 10, an EPB switch 20, a controller 30, and a current sensor 40.

The electronic parking brake 10 may provide a parking braking force to a wheel of a vehicle, for example, a brake disk rotating together with left and right rear wheels.

The electronic parking brake 10 generates a clamping force, which is a clamping force for parking, for each rear wheel. The electronic parking brake 10 is controlled by the controller 30 electrically connected thereto.

The electronic parking brake 10 is operated by an electric motor M to generate the clamping force. The electronic parking brake 10 generates the clamping force by driving the electric motor M to press a brake pad P in a brake caliper C to a brake disk D in the left and right rear wheels.

FIG. 2 is a configuration view of an electronic parking brake applied to the electronic parking brake system according to an embodiment.

Referring to FIG. 2, the electronic parking brake 10 may include a carrier 110 on which a pair of pad plates 111 and 112 are installed to be movable forward or backward to press a brake disk 100 rotating together with a wheel of a vehicle, a caliper housing 120 provided with a cylinder 123 slidably installed on the carrier 110 and in which a piston 121 is installed to move forward or backward by a braking hydraulic pressure, a power conversion unit 130 that presses the piston 121, and a motor actuator 140 to transmit a rotational force to the power conversion unit 130 using the electric motor M.

The pair of pad plates 111 and 112 include the inner pad plate 111 disposed to contact the piston 121 and the outer pad plate 112 disposed to contact a finger portion 122 of the caliper housing 120. The pair of pad plates 111 and 112 are installed on the carrier 110 fixed to a vehicle body so as to be movable forward or backward toward opposite sides of the brake disk 100. In addition, a brake pad 113 is attached to one surface of each of the pad plates 111 and 112 facing the brake disk 100.

The caliper housing 120 is slidably installed on the carrier 110. More specifically, the caliper housing 120 includes the cylinder 123 provided at a rear portion and in which the power conversion unit 130 is installed and the piston 121 is provided to be movable forward and backward, and the finger portion 122 provided at a front portion and formed to be bent in a downward direction to operate the outer pad plate 112. The finger portion 122 and the cylinder 123 are formed integrally.

The piston 121 is provided in a cylindrical form having a cup shape to be slidably inserted into the cylinder 123. The piston 121 presses the inner pad plate 111 toward the brake disk 100 by an axial force of the power conversion unit 130 to which the rotational force of the motor actuator 140 is transmitted. Accordingly, when the axial force of the power conversion unit 130 is applied, the piston 121 moves forward toward the inner pad plate 111 to press the inner pad plate 111, and the caliper housing 120 operates in a direction opposite to the piston 121 by a reaction force, so that the finger portion 122 presses the outer pad plate 112 toward the brake disk 100 to perform braking.

The power conversion unit 130 may serve to press the piston 121 toward the inner pad plate 111 by the rotational force transmitted from the motor actuator 140.

The power conversion unit 130 may include a nut member 131 installed so as to be disposed in the piston 121 and in contact with the piston 121, and a spindle member 135 screwed to the nut member 131.

The nut member 131 may be disposed in the piston 121 in a state in which rotation is restricted to be screwed with the spindle member 135.

The nut member 131 may include a head portion 132 provided to be in contact with the piston 121, and a coupling portion 133 formed to extend from the head portion 132 and having female threads formed on an inner circumferential surface thereof to be screwed with the spindle member 135.

The nut member 131 may move in a forward direction or a backward direction depending on the rotation direction of the spindle member 135 to serve to press and release the piston 121. In this case, the forward direction may be a moving direction in which the nut member 131 approaches the piston 121. The backward direction may be a moving direction in which the nut member 131 becomes away from the piston 121. In addition, the forward direction may be a moving direction in which the piston 121 approaches the brake pad 113. The backward direction may be a moving direction in which the piston 121 becomes away from the brake pad 113.

The spindle member 135 may include a shaft portion 136 provided to pass through the rear portion of the caliper housing 120 to be rotated by the rotational force transmitted from the motor actuator 140, and a flange portion 137 formed to extend in a radial direction from the shaft portion 136. One side of the shaft portion 136 may be rotatably installed through a rear side of the cylinder 123, and the other side of the shaft portion 136 may be disposed in the piston 121. In this case, one side of the shaft portion 136 passing through the cylinder 123 is connected to an output shaft of a speed reducer 142 to receive the rotational force of the motor actuator 140.

The motor actuator 140 may include an electric motor 141 and the speed reducer 142.

The electric motor 141 may press or release the piston 121 by moving the nut member 131 forward or backward by rotating the spindle member 135.

The speed reducer 142 may be provided between an output side of the electric motor 141 and the spindle member 135.

Through the configuration as described above, the electronic parking brake 10 may move the nut member 131 by rotating the spindle member 135 in one direction using the motor actuator 140 to press the piston 121 in a parking operation. The piston 121 pressed by the movement of the nut member 131 presses the inner pad plate 111 to come the brake pad 113 into close contact with the brake disk 100, thereby performing an engagement operation for generating the clamping force.

In addition, the electronic parking brake 10 rotates the spindle member 135 in the opposite direction using the motor actuator 140 in a parking release, so that the nut member 131 pressed against the piston 121 may move backward. The pressing against the piston 121 may be released by the backward movement of the nut member 131. By the pressing against the piston 121 being released, a disengagement operation may be performed which releases the clamping force generated by the brake pad 113 being separated from the brake disk 100.

Referring back to FIG. 1, the EPB switch 20, which is a switch for receiving an intention of a driver for manipulating the electronic parking brake 10, may be provided adjacent to a driver seat of the vehicle.

The EPB switch 20 is provided to be turned on or off by the driver.

The EPB switch 20 transmits a signal corresponding to the parking operation command (engagement command) in a turn-on operation and a signal corresponding to a parking release command (disengagement command) in a turn-off operation to the controller 30.

The controller 30 may engage or disengage the electronic parking brake 10 by a manipulation signal of the EPB switch 20 or a manipulation signal generated by a program related to the operation of the electronic parking brake.

The current sensor 40 may be provided to detect a current flowing in the electric motors M and 141 of the electronic parking brake 10. The current sensor 40 may detect a motor current flowing through the electric motors M and 141 using a shunt resistor or a Hall sensor. In addition to the shunt resistor or Hall sensor, various methods for detecting the motor current may be applied to the current sensor 40.

The controller 30 identifies whether the current clamping force reaches a target clamping force in the parking operation and ends parking operation control.

The controller 30 receives power from a battery 50.

The controller 30 may detect an applied voltage supplied from the battery 50.

The controller 30 provides the power supplied from the battery 50 to the electric motors M and 141 of the electronic parking brake 10 to drive the electric motors M and 141, thereby generating the clamping force. The controller 30 may drive each of the electric motors M and 141 of the electronic parking brake 10 to supply and cut off the power to the electric motors M and 141 when generating or releasing the clamping force.

The controller 30 may perform communication with various systems mounted on the vehicle through a network bus. As the network bus, Ethernet, Media Oriented Systems Transport (MOST), Flexray, Controller Area Network (CAN), Local Interconnect Network (LIN), etc. may be used.

FIG. 3 is a control block diagram of the electronic parking brake system according to an embodiment.

Referring to FIG. 3, the controller 30 may be referred to as an electronic control unit (ECU).

The controller 30 may include a processor 31, a memory 32, an interface circuit 33, a communication interface 34, a drive circuit 35, and a power circuit 36.

The processor 31 may control overall operations of the electronic parking brake system.

The memory 32 may store a program for processing or controlling the processor 31 and various data for operations of the electronic parking brake system.

The memory 32 may include a non-volatile memory such as a flash memory, a read only memory (ROM), and an erasable programmable read only memory (EPROM) as well as a volatile memory such as an S-RAM and a D-RAM.

The interface circuit 33 may receive signals from various switches and sensors connected to the electronic parking brake system. The interface circuit 33 may receive an EPB switch signal and the motor current from the EPB switch 20 and the current sensor 40.

The communication interface 34 performs communication with various systems in the vehicle. The communication interface 34 may communicate with various systems in the vehicle to receive a variety of information including an ambient temperature.

The drive circuit 35 supplies the current to the electric motors M and 141 of the first and second EPBs 10 in response to a control signal of the processor 31 and controls the direction of the current, thereby rotating the electric motors M and 141 forward or reverse. As the electric motors M and 141 rotate forward or reverse, the brake pad 113 moves toward the brake disk 100 or moves toward the opposite side, thereby generating or releasing the clamping force. Accordingly, the electronic parking brake 10 is engaged or disengaged.

The power circuit 36 generates a predetermined operating voltage from the power supplied from the battery 50. The power circuit 36 may generate a driving voltage of the processor 31 or the drive circuit 35. The processor 31 or the drive circuit 35 is operated by the driving voltage provided from the power circuit 36. The processor 31 may detect and recognize the voltage supplied to the electric motors M and 141 of the first and second EPBs 10 using the power circuit 36.

The processor 31 may rotate the electric motor 141 of the electronic parking brake 10 forward or reverse through the drive circuit 35 in the parking operation or parking release.

The processor 31 may perform a parking operation mode or a parking release mode in response to the manipulation signal of the EPB switch 20 manipulated by the driver or the manipulation signal generated by the program related to operation of the electronic parking brake.

In the parking operation mode, the processor 31 may perform the parking operation (Parking Apply) of generating the clamping force by bringing the brake pad 113 into close contact with the brake disk D by moving the nut member 131 in the forward direction by rotating the electric motor 141 in one direction to press the piston 121.

In the parking release mode, the processor 31 may perform the parking release (Parking Release) of releasing the generated clamping force by releasing the brake pad 113 in close contact with the brake disk D by moving the nut member 131 in the backward direction by rotating the electric motor 141 in the opposite direction to release the pressing of the piston 121.

The processor 31 may recognize whether the current parking operation is an initial parking operation or not when the parking operation is requested. For example, the processor 31 may record the number of parking operations in which the parking operation is activated in the memory 32 each time the parking operation is performed, and may recognize whether the current parking operation is the initial parking operation or not according to the recorded number of parking operations. The initial parking operation refers to an initial parking operation performed initially before leaving a factory line.

The processor 31 estimates a motor resistance, a motor temperature, a magnetic flux density and a torque, respectively, by dividing a case where the current parking operation is the initial parking operation and a case where the current parking operation is not the initial parking operation, and estimates the current clamping force using them, and then ends the parking operation control when the estimated current clamping force reaches the target clamping force.

As described above, the performance of the motor of the electronic parking brake may vary depending on temperature. When the motor has a magnet, the magnetic flux density changes depending on temperature, and the torque produced accordingly changes. Therefore, there is a need for a logic that compensates for a change in magnetic flux density depending on temperature and a change in performance due to the change in magnetic flux density.

However, conventionally, an ambient temperature may only be provided from another system mounted on a vehicle, and a motor temperature may not be known because a sensor for measuring the temperature of the motor is not installed, and thus a margin for the target clamping force is set to be large so that it may be applied to all environments of all required temperatures and voltages so that the required performance may be satisfied even under worst temperature and worst voltage conditions.

In a conventional method, because only the voltage and current are checked and the parking operation control is ended, the performance change depending on the temperature may not be estimated. Therefore, target performance is met by identifying the target clamping force by including a margin in which a worst temperature and voltage conditions is reflected. However, this method generates an excessive parking braking force than the required performance under conditions such as normal, high voltage, and room temperature or low temperature. This reduces the durability of the product and requires a higher specification than a required hardware specification, thereby increasing the manufacturing cost and product size.

The electronic parking brake system according to an embodiment estimates the motor resistance, the motor temperature, the magnetic flux density and the torque, respectively, by dividing the case where the current parking operation is the initial parking operation and the case where the current parking operation is not the initial parking operation, and estimates the current clamping force using them, and then ends the parking operation control when the estimated current clamping force reaches the target clamping force. Therefore, the motor temperature may be estimated without a temperature sensor and the change of the clamping force depending on changes in the motor temperature and voltage may be prevented, so that there is no need to set a large margin for the clamping force as in the prior art. Due to this, a loss of competitiveness such as durability, cost, size, weight, etc. of the product may be prevented in advance.

FIG. 4 is a flowchart of a control method of the electronic parking brake system according to an embodiment.

Referring to FIG. 4, the controller 30 identifies whether the parking operation is requested (200). The controller 30 identifies that the parking operation is requested when a signal corresponding to the parking operation command is input from the EPB switch 20.

The controller 30 identifies the target clamping force (202). The controller 30 may identify the target clamping force depending on the vehicle environment, such as an inclination of the vehicle and a battery voltage. The controller 30 may identify the target clamping force depending on the vehicle environment according to the prior art.

The controller 30 drives the electric motor 141 of the electronic parking brake 10 (204).

The controller 30 identifies whether the requested parking operation is the initial parking operation (206).

The controller 30 estimates the clamping force in different methods, respectively, by dividing the case where the requested parking operation is the initial parking operation and the case where the requested parking operation is not the initial parking operation, and ends the parking operation control when the estimated clamping force reaches the target clamping force.

When the requested parking operation is the initial parking operation (YES in 206), the controller 30 estimates the clamping force depending on an ambient temperature (208).

The controller 30 identifies whether a clamping force CCF1 estimated in operation 208 has reached a target clamping force TCF (210).

When the estimated clamping force CCF1 has not reached the target clamping force TCF (NO in 210), the controller 30 moves to operation 208 to perform the following operations.

On the other hand, when the estimated clamping force CCF1 has reached the target clamping force, the controller 30 stops the electric motor 141 to end the parking operation control (212).

When the requested parking operation is not the initial parking operation (NO in 206), the controller 30 estimates the clamping force with the motor temperature (214).

The controller 30 identifies whether a clamping force CCF2 estimated in operation 214 has reached the target clamping force TCF (216).

When the estimated clamping force CCF2 has not reached the target clamping force TCF (NO in 216), the controller 30 moves to operation 214 to perform the following operations.

On the other hand, when the estimated clamping force CCF2 has reached the target clamping force, the controller 30 stops the electric motor 141 to end the parking operation control (218).

FIG. 5 is a flowchart illustrating a process of estimating the clamping force depending on the ambient temperature in the flowchart of FIG. 4.

Referring to FIG. 5, in the case of being an initial parking operation, the controller 30 receives the ambient temperature from another system mounted on the vehicle through the communication interface 34 (300).

The controller 30 also detects a motor voltage $V_{ECU}$, which is a voltage output to the electric motor 141 (302), and detects a motor current I through the current sensor 40 (304).

The controller 30 estimates a motor resistance $R_{RT}$ [Ω] when the electronic parking brake 10 is initially operated before leaving the factory line (306). The controller 30 may estimate the motor resistance based on the ambient temperature by dividing a voltage obtained by subtracting a voltage drop of a wire harness from the motor voltage $V_{ECU}$ by a flowing current. The motor resistance may be estimated using a current in a no-load section during a parking operation section. In general, the parking operation section may be largely divided into an in-rush current section, the no-load section, and a load section depending on the characteristics of a change in current value. The in-rush current section is a section in which an in-rush current rapidly increases initially. Because a large amount of current is needed instantaneously due to the inertia to remain at rest when a current is input to the electric motor 141, a current rapidly increases initially. The no-load section is a section in which the brake pad 113 is pushed in the direction of the brake disk 100 while the electric motor 141 rotates after the in-rush current flows. A no-load state is formed in which a load does not act on the electric motor 141 until the brake pad 113 comes into contacts with the brake disk 100. At this time, a current having a constant current value of 0 or more flows for a predetermined time in the electric motor 141. The load section is a section in which the brake pad 113 is in contact with the brake disk 100 to generate a parking braking force.

The controller 30 stores the estimated motor resistance $R_{RT}$ in the memory 32 (308). The motor resistance $R_{RT}$ based on the ambient temperature at the time of the initial operation stored in the memory 32 is used to estimate the motor resistance and motor temperature at the time of performing the operation after the initial parking operation.

The controller 30 estimates a motor temperature $T_{RT}$ [° C.] (310). When the initial parking operation is performed on the factory line, a separate driving and brake operation are not performed, and thus a brake disk temperature and motor temperature may be considered to be saturated with the ambient temperature in the factory. Therefore, the motor temperature $T_{RT}$ at the time of the initial operation may be regarded as the ambient temperature.

The controller 30 stores the estimated motor temperature $T_{RT}$ in the memory 32 (312). The motor temperature $T_{RT}$ at the time of the initial parking operation stored in the memory 32 is used to estimate the motor resistance and motor temperature at the time of performing the operation after the initial parking operation.

The controller 30 estimates a magnetic flux density $B_{RT}$ [T] of the electric motor 141 depending on the estimated motor temperature $T_{RT}$ (314), and estimates a torque $T_{T\_RT}$ [Nm] of the electric motor 141 (316).

A magnet is accommodated in the electric motor 141, and a magnetic flux density of the magnet changes in inverse proportion to temperature. A magnetic force is proportionally increased depending on the magnetic flux density, which is proportional to the torque of the electric motor 141.

The magnetic flux density $B_{RT}$ at the initial parking operation may be preset depending on the motor temperature $T_{RT}$. For example, when the temperature is 20° C. in a B-H curve showing a relationship between a magnetic field H of ferrite and the magnetic flux density B, the magnetic flux density may be 450 mT. That is, in the case of being the initial parking operation and the ambient temperature of 20° C., the magnetic flux density may be 450 mT.

The torque $T_{T\_RT}$ [Nm] at the time of the initial operation may be calculated by the following Equations [1] and [2].

$$T_{T\_RT} = k_t * \phi_{RT} * I \quad\quad \text{Equation [1]}$$

$$\phi_{RT} = B_{RT} * A \quad\quad \text{Equation [2]}$$

Herein, $\phi_{RT}$ is a magnetic flux[Wb], $k_t$ is a torque constant [Nm/A], A is an area[m²], and I is a motor current. $k_t$ and A are constants. $k_t$ may be identified by the rated torque and rated current.

The controller 30 estimates the clamping force, which is the clamping force of the electronic parking brake 10 (318). The controller 30 may calculate the clamping force $F_{RT}$ of the electronic parking brake 10 depending on the torque $T_{T\_RT}$ in the following Equation [3].

$$T_{T\_RT}/I = k_t * B_{RT} * I = (F_{RT}/I) * \{\text{lead}/(\eta_{cal} * 2\pi)\} \quad\quad \text{Equation [3]}$$

Herein, I is the motor current, $k_t$ is the torque constant [Nm/A], $B_{RT}$ is the magnetic flux density, lead is a lead[Mm]

of the spindle member 135, and $\eta_{cal}$ is an efficiency [%] of the caliper. lead and $\eta_{cal}$ are constants.

The magnetic force increases proportionally depending on the magnetic flux density, which is proportional to the torque of the electric motor 141 and is proportional to the clamping force.

When the clamping force $F_{RT}$ of the electronic parking brake 10 is estimated through the above processes and then the estimated clamping force $F_{RT}$ reaches the target clamping force, the parking operation control is ended.

In the case of not being the initial parking operation, a current motor temperature $T_{ar}$ is estimated using the motor resistance $R_{RT}$, the motor temperature $T_{RT}$, a temperature-resistance proportional characteristic of a conductor, the current motor voltage $V_{ECU}$, the motor current I, and a wire harness resistance $R_h$, which are stored in the initial parking operation, a clamping force $F_{ar}$ is estimated by estimating a magnetic flux density $B_{ar}$ and a torque $T_{T\_ar}$ based on the estimated motor temperature $T_{ar}$. Thereafter, as in the initial parking operation, when the estimated clamping force $F_{ar}$ reaches the target clamping force, the parking operation control is ended.

FIG. 6 is a flowchart illustrating a process of estimating the clamping force depending on the motor temperature in the flowchart of FIG. 4.

Referring to FIG. 6, in the case of not being the initial parking operation, the controller 30 detects the motor voltage $V_{ECU}$, which is a voltage output to the electric motor 141 (400), and detects the motor current I through the current sensor 40 (402).

The controller 30 estimates the motor temperature $T_{ar}$ (404). In the case of being a parking operation after the initial parking operation, the temperature of the brake disk may be higher than the ambient temperature in the factory due to driving and/or braking operation.

A motor resistance $R_{ar}$ at an arbitrary temperature may be expressed as the following Equation [4].

$$R_{ar}=R_{RT}*[1+0.004*(T_{ar}-T_{RT})]=(V_{ECU}-I*R_h)/I \quad \text{Equation [4]}$$

When Equation [4] is arranged with respect to the motor temperature $T_{ar}$, it may be expressed as Equation [5] below.

$$T_{ar}=[\{(V_{ECU}-I*R_h)/(I*R_{RT})\}-1]/0.004+T_{RT} \quad \text{Equation [5]}$$

Herein, 0.004 is a temperature coefficient of copper [Ω/° C.], $V_{ECU}$ is the motor voltage, $R_h$ is the wire harness resistance, $R_{RT}$ is the motor resistance in the initial parking operation, $T_{RT}$ is the motor temperature in the initial parking operation, and I is the motor current.

As such, the arbitrary temperature, that is, the motor temperature $T_{ar}$ at the current temperature may be calculated depending on a voltage drop amount of the electric motor 141. That is, it may be calculated from the motor voltage, the motor resistance in the initial parking operation, and the motor temperature and the motor current in the initial parking operation.

The controller 30 estimates the magnetic flux density $B_{ar}$ of the electric motor 141 depending on the estimated motor temperature $T_{ar}$ (406), and estimates the torque $T_{T\_ar}$ of the electric motor 141 (408).

The magnetic flux density $B_{ar}$ of the electric motor 141 at the current motor temperature $T_{ar}$ may be expressed as the following Equation [6].

$$B_{ar}=B_{RT}*[1+50/(B_{RT}*60)*(T_{ar}-T_{RT})] \quad \text{Equation [6]}$$

Herein, $B_{RT}$ is the magnetic flux density in the initial parking operation, $T_{ar}$ is the current motor temperature, and $T_{RT}$ is the motor temperature in the initial parking operation.

The torque $T_{T\_ar}$ of the electric motor 141 at the current motor temperature $T_{ar}$ may be calculated by the following Equations [7] and [8].

$$T_{T\_ar}=k_t*\phi_{ar}*I \quad \text{Equation [7]}$$

$$\phi_{ar}=B_{ar}*A \quad \text{Equation [8]}$$

Herein, $\phi_{ar}$ is the magnetic flux [Wb], $k_t$ is the torque constant [Nm/A], $B_{ar}$ is the magnetic flux density, A is the area [m$_2$], and I is the motor current. $k_t$ and A are constants.

The controller 30 estimates the clamping force, which is the clamping force of the electronic parking brake 10 (410). The controller 30 may calculate the clamping force $F_{ar}$ of the electronic parking brake 10 depending on the torque $T_{T\_ar}$ by the following Equation [9].

$$T_{T\_ar}/I=k_t*B_{ar}*A=(F_{ar}/I)*\{\text{lead}/(\eta_{cal}*2\pi)\} \quad \text{Equation [9]}$$

Herein, I is the motor current, $k_t$ is the torque constant [Nm/A], $B_{ar}$ is the magnetic flux density, lead is the lead [Mm] of the spindle member 135, and $\eta_{cal}$ is the efficiency [%] of the caliper. lead and $\eta_{cal}$ are constants.

When the clamping force $F_{ar}$ of the electronic parking brake 10 is estimated through the above processes and then the estimated clamping force $F_{ar}$ reaches the target clamping force, the parking operation control is ended.

When Equation [3] is divided into Equation [9] and arranged, it may be expressed as Equation [10].

$$(F_{ar}/I)/(F_{RT}/1)=k_t*B_{RT}*[1+50/(B_{RT}*60)*(T_{ar}-T_{RT})]$$
$$*A/(k_t*B_{RT}*A)=[1+50/(B_{RT}*60)*(T_{ar}-T_{RT})] \quad \text{Equation [10]}$$

When the above Equation [10] is rearranged, it may be expressed as the following Equation [11].

$$(F_{ar}/I)=(F_{RT}/I)*[1+50/(B_{RT}*60)*(T_{ar}-T_{RT})] \quad \text{Equation [11]}$$

As may be seen from Equation [11], a slope between the clamping force and the motor current depending on the motor temperature in the initial parking operation may be compensated. The slope of the motor current-clamping force varies with the temperature and voltage, but the slope may not be compensated for in the prior art. However, according to an embodiment of the present disclosure, the slope of the motor current-clamping force varied with the temperature and voltage may be compensated.

In a conventional method, because only the voltage and current are checked and the parking operation control is ended, the performance change depending on the temperature may not be estimated. Therefore, the target performance is met by setting the target current including the margin under the worst temperature and voltage conditions.

However, in this case, a parking braking force that is more excessive than the required performance is generated under conditions such as normal/high voltage and room temperature/and low temperature. This reduces the durability of the hardware product and results in a higher-spec design than the required hardware specification, thereby increasing the cost and size.

On the other hand, because the disclosure controls based on the required clamping force by estimating temperature and voltage, even though the control margin is considered, the dispersion of the clamping force is smaller than that of the prior art. Therefore, because optimal hardware design is possible, not only may the size of the motor and actuator and the manufacturing cost be reduced, but also durability may be increased due to the generation of target clamping force depending on temperature and voltage.

Although the above embodiments have described that an electronic parking brake applied to an electronic parking brake system is a motor-on-caliper type electronic parking brake, the disclosure is not limited thereto. The disclosure may be applied to an electric drum brake in which a drum rotating together with a wheel is provided therein and a pair of brake shoes to which a brake lining is attached expands and brakes by a motor.

In addition, although the above embodiments have described with respect to an electronic parking brake system having a motor-on-caliper type electronic parking brake or an electric drum brake, the disclosure is not limited thereto. The electronic parking brake system may be an electro mechanical brake system that performs not only a service brake function for providing a braking force in a driving situation of a vehicle but also a parking brake function for maintaining the vehicle in a stop state when parking.

As is apparent from the above, in an electronic parking brake system according to the disclosure, there is no need to set a margin for a clamping force to be large by estimating a temperature of a motor without a temperature sensor and preventing a change in clamping force depending on a change in temperature and voltage of the motor, so that a loss of competitiveness in durability, cost, size, weight, etc. of the product can be prevented in advance.

Herein, the aforementioned controller and/or components thereof may include one or more processors/microprocessors combined with a computer-readable recording medium storing computer-readable code/algorithm/software. The processors/microprocessors may execute the computer-readable code/algorithm/software stored in the computer-readable recording medium to perform the above-described functions, operations, steps, and the like.

The above-described controller and/or components thereof may further include a memory implemented as a computer-readable non-transitory recording medium or a computer-readable temporary recording medium. The memory may be controlled by the aforementioned controller and/or components thereof, and may be configured to store data transferred to or received from the aforementioned controller and/or components thereof, or may be configured to store data to be processed or processed by the aforementioned controller and/or components thereof.

The disclosed embodiments may be implemented as computer-readable code/algorithm/software on a computer-readable recording medium. The computer-readable recording medium may be a computer-readable non-transitory recording medium such as a data storage device capable of storing data readable by a processor/microprocessor. Examples of computer-readable recording media include hard disk drives (HDDs), solid state drives (SSDs), silicon disk drives (SDDs), read-only memory (ROM), CD-ROMs, magnetic tapes, floppy disks, optical data storage devices. etc.

What is claimed is:

1. An electronic parking brake system comprising:
    an electronic parking brake (EPB) comprising a piston provided to press a pair of brake pads disposed on opposite sides of a brake disk rotating together with a wheel of a vehicle, a nut member provided to press the piston, a spindle member provided to move the nut member, and an electric motor provided to rotate the spindle member;
    a processor electrically connected to the electric motor, wherein the processor is configured to:
        identify whether a requested parking operation is an initial parking operation,
        upon the requested parking operation being identified as the initial parking operation:
            estimate a first motor temperature based on an ambient temperature during the initial parking operation,
            store the estimated first motor temperature in a memory,
            estimate a first clamping force depending on the first motor temperature, and
            end the initial parking operation when the first clamping force reaches a target clamping force, and
        upon the requested parking operation being identified as a parking operation after the initial parking operation:
            estimate a motor temperature based on a motor voltage, a motor resistance measured during the initial parking operation, the first motor temperature stored in the memory, and a motor current,
            estimate a clamping force required for parking depending on the estimated motor temperature, and
            end the parking operation after the initial parking operation when the clamping force reaches the target clamping force,
        wherein the processor is further configured to estimate the clamping force in different methods, respectively, by distinguishing between a case where the requested parking operation is the initial parking operation and a case where the requested parking operation is not the initial parking operation.

2. The electronic parking brake system according to claim 1,
    wherein upon the requested parking operation being identified as the initial parking operation, the processor is further configured to estimate the motor resistance of the electric motor and to store the motor resistance in the memory, and
    wherein the motor resistance is a resistance value obtained by dividing a voltage obtained by subtracting a voltage drop of a wire harness from the motor voltage by a no-load current.

3. The electronic parking brake system according to claim 1, wherein
    upon the requested parking operation being identified as the initial parking operation, the processor further estimates a first magnetic flux density based on the first motor temperature, estimates a first torque of the electric motor based on the first magnetic flux density, the corresponding motor current, and a torque constant, and estimates the first clamping force based on the first torque.

4. The electronic parking brake system according to claim 3, wherein
    upon the requested parking operation being identified as the parking operation after the initial parking operation, the processor further estimates a second magnetic flux density based on:
    a temperature difference between the first motor temperature and the motor temperature, and
    the first magnetic flux density.

5. The electronic parking brake system according to claim 4, wherein
    upon the requested parking operation being identified as the parking operation after the initial parking operation, the processor further estimates a second torque of the electric motor based on the second magnetic flux density, the corresponding motor current, and the torque constant.

6. The electronic parking brake system according to claim 5, wherein
upon the requested parking operation being identified as the parking operation after the initial parking operation, the processor further estimates the clamping force based on the second torque.

7. The electronic parking brake system according to claim 1, wherein
the electronic parking brake is a motor-on-caliper type electronic parking brake or an electric drum brake.

8. A control method of an electronic parking brake system for controlling an electronic parking brake providing a clamping force required for parking to a vehicle by an electric motor, the control method comprising:
identifying whether a requested parking operation is an initial parking operation;
upon the requested parking operation being identified as the initial parking operation:
estimating a first motor temperature based on an ambient temperature during the initial parking operation;
storing the estimated first motor temperature in a memory,
estimating a first clamping force depending on the first motor temperature, and
ending the initial parking operation when the first clamping force reaches a target clamping force; and
upon the requested parking operation being identified as a parking operation after the initial parking operation:
estimating a motor temperature based on a motor voltage, a motor resistance measured during the initial parking operation, the first motor temperature stored in the memory, and a motor current;
estimating the clamping force depending on the motor temperature; and
ending the parking operation after the initial parking operation when the clamping force reaches the target clamping force,
wherein the control method further comprises estimating the clamping force in different methods, respectively, by distinguishing between a case where the requested parking operation is the initial parking operation and a case where the requested parking operation is not the initial parking operation.

9. The control method according to claim 8, wherein
upon the requested parking operation being identified as the initial parking operation, the method further comprises:
estimating a first magnetic flux density based on the first motor temperature;
estimating a first torque of the electric motor based on the first magnetic flux density, the corresponding motor current, and a torque constant; and
estimating the first clamping force based on the first torque.

10. The control method according to claim 9, wherein
upon the requested parking operation being identified as the parking operation after the initial parking operation, the method further comprises:
estimating a second magnetic flux density based on:
a temperature difference between the first motor temperature and a second motor temperature, and
the first magnetic flux density;
estimating a second torque of the electric motor based on the second magnetic flux density, the corresponding motor current, and the torque constant; and
estimating the clamping force based on the second torque.

* * * * *